US012743370B2

(12) United States Patent
Roberts

(10) Patent No.: US 12,743,370 B2
(45) Date of Patent: Sep. 22, 2026

(54) MEMORY ACCESS STATISTICS MONITORING

(71) Applicant: Micron Technology, Inc., Boise, ID (US)

(72) Inventor: David A. Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/954,112

(22) Filed: Nov. 20, 2024

(65) Prior Publication Data

US 2025/0077411 A1 Mar. 6, 2025

Related U.S. Application Data

(63) Continuation of application No. 18/512,850, filed on Nov. 17, 2023, now Pat. No. 12,158,840, which is a continuation of application No. 17/591,729, filed on Feb. 3, 2022, now Pat. No. 11,860,773.

(51) Int. Cl.
*G06F 12/02* (2006.01)
*G06F 12/0882* (2016.01)
*G06F 13/16* (2006.01)

(52) U.S. Cl.
CPC ...... *G06F 12/0238* (2013.01); *G06F 12/0292* (2013.01); *G06F 12/0882* (2013.01); *G06F 13/1621* (2013.01); *G06F 13/1689* (2013.01)

(58) Field of Classification Search
None
See application file for complete search history.

(56) References Cited

U.S. PATENT DOCUMENTS

| | | | | |
|---|---|---|---|---|
| 8,793,434 | B2 | 7/2014 | Hsu | |
| 9,727,241 | B2 | 8/2017 | Loh et al. | |
| 9,934,148 | B2 | 4/2018 | Roberts et al. | |
| 10,387,340 | B1 | 8/2019 | Baryudin | |
| 10,802,977 | B2 | 10/2020 | Mappouras | |
| 11,487,675 | B1 * | 11/2022 | Volpe | G06F 12/0246 |
| 11,635,919 | B1 | 4/2023 | Pohlack | |

(Continued)

OTHER PUBLICATIONS

Qureshi, et al., Adaptive Insertion Policies for High Performance Caching, Conference Paper in ACM SIGARCH Computer Architecture News, Jun. 2007, 12 pages.

*Primary Examiner* — Yaima Rigol
(74) *Attorney, Agent, or Firm* — Brooks, Cameron & Huebsch, PLLC

(57) ABSTRACT

Systems, apparatuses, and methods related to memory access statistics monitoring are described. A host is configured to map pages of memory for applications to a number of memory devices coupled thereto. A first memory device comprises a monitoring component configured to monitor access statistics of pages of memory mapped to the first memory device. A second memory device does not include a monitoring component capable of monitoring access statistics of pages of memory mapped thereto. The host is configured to map a portion of pages of memory for an application to the first memory device in order to obtain access statistics corresponding to the portion of pages of memory upon execution of the application despite there being space available on the second memory device and adjust mappings of the pages of memory for the application based on the obtained access statistics corresponding to the portion of pages.

18 Claims, 5 Drawing Sheets

(56) References Cited

U.S. PATENT DOCUMENTS

| | | | | |
|---|---|---|---|---|
| 2006/0161719 | A1* | 7/2006 | Bennett | G06F 12/1483 711/6 |
| 2009/0276600 | A1* | 11/2009 | Wallman | G06F 9/5016 711/170 |
| 2011/0078361 | A1 | 3/2011 | Chen | |
| 2011/0238920 | A1* | 9/2011 | Hooker | G06F 12/0862 711/E12.071 |
| 2012/0017039 | A1 | 1/2012 | Margetts | |
| 2012/0047312 | A1 | 2/2012 | Nathuji | |
| 2013/0290597 | A1 | 10/2013 | Faber | |
| 2014/0281260 | A1 | 9/2014 | Peterson | |
| 2015/0058521 | A1 | 2/2015 | Armstrong | |
| 2015/0106582 | A1 | 4/2015 | Mai et al. | |
| 2015/0199126 | A1 | 7/2015 | Jayasena | |
| 2016/0021020 | A1 | 1/2016 | Deguchi | |
| 2016/0049181 | A1 | 2/2016 | Jafri | |
| 2016/0342364 | A1 | 11/2016 | Ono | |
| 2017/0068633 | A1 | 3/2017 | Kwon | |
| 2018/0260323 | A1 | 9/2018 | John | |
| 2019/0370177 | A1 | 12/2019 | Olderdissen | |
| 2020/0218668 | A1 | 7/2020 | Han | |
| 2021/0072918 | A1 | 3/2021 | Gupta | |
| 2023/0057083 | A1 | 2/2023 | Rudoff | |

* cited by examiner

MEMORY ACCESS STATISTICS MONITORING

PRIORITY INFORMATION

This Application is a Continuation of U.S. application Ser. No. 18/512,850, filed on Nov. 17, 2023, which is a Continuation of U.S. application Ser. No. 17/591,729, filed on Feb. 3, 2022, now issued as U.S. Pat. No. 11,860,773 on Jan. 2, 2024, the contents of which are incorporated herein by reference.

GOVERNMENT RIGHTS

This invention was made with U.S. Government support under Agreement No. DE-AC05-00OR22725, awarded by the U.S. Department of Energy. The U.S. Government has certain rights in the invention.

TECHNICAL FIELD

Embodiments of the disclosure relate generally to computing systems, and more specifically, relate to monitoring memory access statistics.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Figure 1:
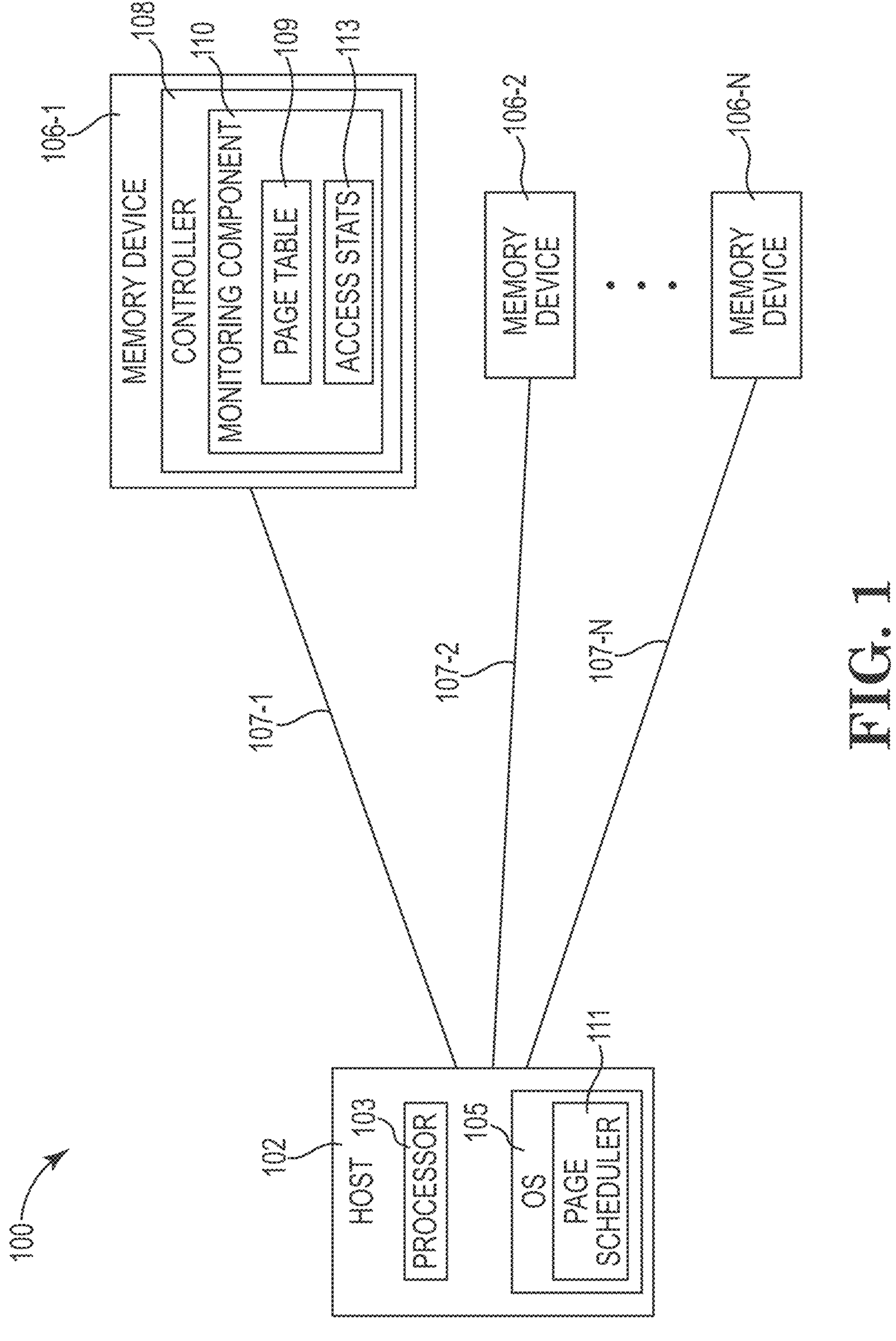
FIG. 1 illustrates an example computing system that includes a host and a number of memory devices in accordance with various embodiments of the present disclosure.

Systems, apparatuses, and methods related to monitoring access statistics are described. A monitoring component can be included on a hybrid memory system and can include circuitry to monitor an amount of times particular pages of memory are accessed in a particular period of time. The memory device on which the monitoring component is implemented can receive an allocation of pages of memory and the monitoring component can track a number of times the allocated pages of memory were accessed over a particular period of time. The allocated pages of memory can be a portion of the total pages of memory for an application executed on a memory device. The access statistics for other pages of memory for the program can then be determined based on the access statistics of the allocated pages of memory for the program.

Hybrid memory systems can include multiple (e.g., different) types of memory devices. Some memory devices can include a controller capable of maintaining (e.g., via a monitoring component) access statistics of the pages of memory stored on the memory device. However, memory devices that include such a controller may have a higher latency as compared to memory devices that do not have a controller or that have a less complex controller (e.g., control circuitry incapable of tracking access statistics).

A hybrid memory system can comprise different types of memory devices. The memory devices can be memory modules such as a DRAM DIMM or NVDIMM that may not have processing or monitoring capability (e.g., via an on-die memory controller) in order to reduce latency. Memory devices can also include other types of modules or memory sub-systems that can include a memory controller such as an SSD coupled to host via NVMe bus, for example, or such as a CXL device (i.e., a memory device coupled to the host via CXL bus) that may employ different memory technologies (e.g., DRAM, FeRAM, etc.)

To monitor the access statistics of the pages of memory within and among various memory devices, a host (e.g., host CPU) can maintain only limited page access statistics to identify heavily used pages of memory. Such access statistics can be useful, for instance, for an operating system that employs page scheduling to allocate virtual pages of memory to various memory devices. Various page scheduling schemes exist for determining how to allocate pages of memory in order to achieve desired system performance by providing increased speed of application execution, for example. As an example, a page scheduling algorithm can use access statistics to predict the demand of particular pages and can move the most heavily accessed pages to faster memory when/if available in order to maximize performance (e.g., execution speed).

Some memory devices include a controller having sufficient processing capability to monitor and/or maintain access statistics of the memory device's pages. Such statistics can include read and/or write access counts, which can be at a page and/or subpage granularity, among other access statistics. However, many memory devices do not include a controller capable of monitoring and/or maintaining detailed access statistics. For such memory devices (e.g., memory devices not capable of monitoring detailed access statistics) it would still be useful for a page scheduler to be able to use more detailed access statistics (e.g., access statistics that are more detailed than those maintained by a host CPU).

In some approaches, every page of memory corresponding to an application would be allocated to a "smart" memory device that includes a monitoring component so that every page of memory for the application is monitored by a monitoring component. This can lead to a decrease in performance of the computing system because monitoring every page of memory for an application during execution of the application can increase the latency associated with application execution. This approach of monitoring access statistics for an application increases the time it takes to execute a monitored application and therefore decreases the performance of the computing system implementing this approach.

Various embodiments address the above deficiencies by employing a page sampling method in which virtual pages of memory corresponding to applications are allocated (e.g., remapped) to physical addresses (e.g., physical pages) on a memory device having a monitoring component such as those described herein. In this manner, access statistics corresponding to memory pages that would likely be mapped to "faster" memory devices that may be incapable of monitoring access statistics can still be obtained, in a sampled manner, by a "slower" memory device that is capable of detailed access statistic monitoring. Although such page sampling may reduce the speed of application execution, the otherwise unavailable access statistics can be accumulated and used by the page scheduler for improving system performance.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" (e.g., a number of memory banks) can refer to one or more memory banks, whereas a "plurality of" is intended to refer to more than one of such things.

Furthermore, the words "can" and "may" are used throughout this application in a permissive sense (i.e., having the potential to, being able to), not in a mandatory sense (i.e., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

FIG. 1 illustrates an example computing system that includes a host and memory devices in accordance with some embodiments of the present disclosure. The computing system 100 can include a host 102 that includes a processor 103, an operating system 105, and a page scheduler 111. The computing system 100 can also include one or more memory devices 106-1, 106-2, 106-3 (individually or collectively referred to as memory devices 106) coupled to the host 102 via interfaces 107-1, 107-2, . . . , 107-N (individually or collectively known as interfaces 107).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 102 that is coupled to one or more memory devices 106. In some embodiments, the host system 102 is coupled to different types of memory devices 106. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host 102 can include an operating system 105. As used herein, the term "operating system" refers to system software that manages computer hardware, software resources, and provides common services for computer programs. For hardware functions such as input and output and memory allocation, the operating system 105 can act as an intermediary between programs and the computer hardware. Applications can make use of the operating system 105 by making requests for services through a defined application interface. The operating system can include a page scheduler 111. The page scheduler 111 can execute a page scheduling operation to allocate pages of memory to a memory device 106 based on the access statistics 113 of the pages of memory.

The host 102 can be coupled to memory devices 106 via a physical host interface (e.g., interfaces 107-1, 107-2, . . . , 107-N). Examples of a physical host interface include, but are not limited to, a CXL interface, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), Gen-Z, Cache Coherent Interconnect for Accelerators (CCIX), Open Coherent Accelerator Processor Interface (CAPI), or any other interface. The physical host interface can be used to transmit data between the host system 102 and the memory devices 106. In general, the host system 102 can access multiple memory devices 106 via a same communication connection, multiple separate communication connections, and/or a combination of communication connections.

In some embodiments, the memory device can be a Compute Express Link (CXL) compliant memory device (e.g., the memory device can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface.

The memory devices 106 can include any combination of the different types of non-volatile memory devices (e.g., memory devices 106) and/or volatile memory devices. The volatile memory devices can be, but are not limited to, random access memory (RAM), such as dynamic random-access memory (DRAM) and synchronous dynamic random access memory (SDRAM).

Some examples of non-volatile memory devices (e.g., memory devices 106) include negative- and (NAND) type flash memory and write-in-place memory, such as three-dimensional cross-point ("3D cross-point") memory device, which is a cross-point array of non-volatile memory cells. NAND type flash memory includes, for example, two-dimensional NAND (2D NAND) and three-dimensional NAND (3D NAND).

Although non-volatile memory components such as three-dimensional cross-point arrays of non-volatile memory cells and NAND type memory (e.g., 2D NAND, 3D NAND) are described, the memory devices 106 can be based on various other type of non-volatile memory or storage device, such as such as, solid state drives (SSD), read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The host 102 can be configured to remap an address for at least one page of memory for an application to a first memory device 106-1 coupled to the host 102 from a second memory device 106-2 coupled to the host 102. In some embodiments, the first memory device 106-1 can include a memory device controller 108 and a monitoring component 110. In other embodiments, the memory device controller 108 and the monitoring component 110 can be on the second memory device 106-2 and/or the third memory device 106-3 instead of the first memory device 106-1.

In some embodiments, the memory device controller 108 can be configured to store the access statistics 113 of the at least one page of memory corresponding to the application in the monitoring component 110 of the first memory device 106-1. The memory device controller 108 is configured to save the access statistics 113 of the at least one page of memory to a table of statistics stored in the monitoring component 110 of the controller (e.g. SRAM in 108) or in memory of the memory device 106-1. In some embodiments, the table of statistics can be accessible (e.g., by host 102) through the memory device controller 108. The table of statistics can be stored entirely on a controller chip, stored in a reserve portion of the underlying memory, and/or cached by the memory device controller 108.

The host 102 can extrapolate access statistics 113 for other pages of memory corresponding to the application executed on the second memory device 106-2 and/or third memory device 106-3. If one page of memory out of a group of related (in terms of expected memory access pattern, e.g. from a single application memory allocation call) pages of memory is allocated to the first memory device 106-1 while remaining pages remain on the second memory device 106-2 or third memory device 106-3, the access statistics 113 of the other pages of memory in the group can be extrapolated using the access statistics 113 of the one page of memory because all of the pages of memory in the group are likely to have similar access statistics 113. In some embodiments, pages of memory allocated to the first memory device 106-1 are picked uniformly because an application may allocate its data to contiguous pages of memory. As used herein, the term "uniformly" refers to picking pages of memory to allocate to the first memory device such that there is an equal number of pages of memory between each allocated page of memory. This allows the access statistics 113 of the pages of memory contiguous to each allocated page of memory to be extrapolated since the contiguous pages of memory may have similar access statistics 113 to the allocated pages of memory. For example, if every fourth page of memory for an application is allocated to the first memory device 106-1, the access statistics 113 of the three intermediate pages of memory for the application can be extrapolated from the access statistics 113 monitored by the first memory device 106-1.

In some embodiments, the host 102 can allocate the at least one page of memory corresponding to the application and the other pages of memory corresponding to the application to the first memory device 106-1 or the second memory device 106-2 based on the access statistics 113 of the at least one page of memory corresponding to the application and the other pages of memory corresponding to the application. The pages of memory can also be allocated to the third memory device 106-3. The pages of memory can be allocated based on a page scheduling policy executed by the host 102.

The monitoring component 110 is configured to monitor access statistics 113 of the at least one page of memory that was mapped to the first memory device 106-1. As used herein, the term "access statistics" refers to information about how often certain pages of memory are accessed and when certain pages of memory are accessed. In some embodiments, the access statistics 113 of the at least one page of memory for the application can include a number of times the at least one page of memory was accessed, which of the pages of memory were least recently used, an order in which the pages of memory were accessed, which cache lines in the memory were accessed, or a combination thereof. In some embodiments, the at least one page of memory for the application and other pages of memory for the application can be virtual memory. If the pages of memory for the application are virtual memory, the operating system 105 can maintain a map of virtual addresses to physical addresses (e.g., page table 109).

We define a sampling interval as a period of time for which a page remains allocated in memory device 106-1. After each sampling interval, the OS 105 can optionally move pages between memory types/devices to monitor different pages within a group. This helps to increase the accuracy of extrapolated page statistics. In some embodiments, the at least one page of memory for the application can be chosen sequentially over multiple sampling intervals (i.e., rotating through all pages in a data structure). In other embodiments, the at least one page of memory for the application can be chosen at random. In embodiments where the at least one page of memory is chosen sequentially over multiple sampling intervals, the at least one page of memory can be one page of memory out of every group of, for example, four contiguous pages of memory for an application. In this embodiment, every fourth page of memory for the application can be allocated from the second memory device 106-2 and/or the third memory device 106-3 to the first memory device 106-1 and the monitoring component 110 can monitor the access statistics 113 of the at least one page of memory that was allocated to memory device 106-1. Data structures in program memory can have a consistent access pattern throughout the entire structure. Since the access across pages of memory for a program are consistent, access statistics 113 for the other pages of memory for the application can be extrapolated based on the access statistics 113 of the at least one page of memory for the application.

In some embodiments, the operating system 104 can be configured to execute a page scheduling policy to map the at least one page of memory for the application and the other pages of memory for the application to either the first memory device 106-1 or the second memory device 106-2 and/or third memory device 106-3 based on the access statistics 113 of the at least one page of memory for the application and the access statistics 113 for the other pages of memory for the application. The monitoring statistics can be used to determine, for example, which pages of memory have been accessed more frequently the other pages of memory. To improve the performance of the computing device and increase the speed at which the computing system executes applications, the operating system 105 can execute a page scheduling policy to allocate the most frequently used pages of memory to faster memory devices 106 and allocate the least frequently used pages of memory to slower memory devices 106. The faster memory devices 106 may be memory devices 106 that do not include a monitoring component (e.g., such as memory device 106-2 and memory device 106-3) and the slower memory device 106 can be a memory device that includes a monitoring component (e.g., memory device 106-1).

In some embodiments, the first memory device 106-1 can be as fast or faster than the second memory device 106-2 and/or the third memory device 106-3. The speed of a memory device 106 can be determined by, at least, the capacity of the memory device 106, the power consumption of the memory device 106, and the endurance of the memory device 106.

Figure 2A:
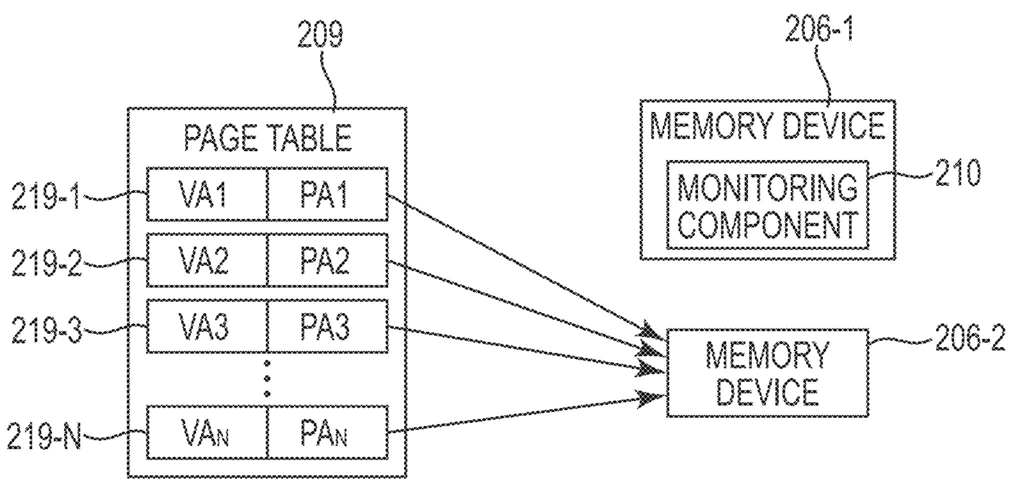
FIG. 2A illustrates an example of page table mappings to a number of memory devices in accordance with various embodiments of the present disclosure.

FIG. 2A illustrates an example of page table mappings to a number of memory devices in accordance with various embodiments of the present disclosure. The page table 209 can include page table entries 219-1, 219-2, 219-3, . . . , 219-N (individually or collectively referred to as page table entries 219) and memory devices 206-1 and 206-2. The memory devices 206-1 and 206-2 can be analogous to respective memory devices 106-1 and 106-2 shown in FIG. 1. The page table 209 structure is not limited to the one illustrated. For example, a multi-level page table may be used as per modern Operating Systems.

Each page table entry 219 can include a virtual address (VA) and a corresponding physical address (PA). As shown in FIG. 2A, in this example, each page table entry is being allocated to the second memory device 206-2. This indicates that, in FIG. 2A, none of the pages of memory in the page table entries 219 are being monitored by the monitoring component 210 on the first memory device 206-1. In some embodiments, every page table entry 219 can be allocated to the second memory device 206-2 because the page table entries 219 have not yet been allocated to the first memory device 206-1 so the first memory device 206-1 can monitor the access statistics of the page table entries 219. In other embodiments, every page table entry 219 has been allocated to the second memory device 206-2 because they were previously allocated to the first memory device 206-1 and were allocated to the second memory device 206-2 because the page table entries 219 include more frequently accessed pages of memory.

Figure 2B:
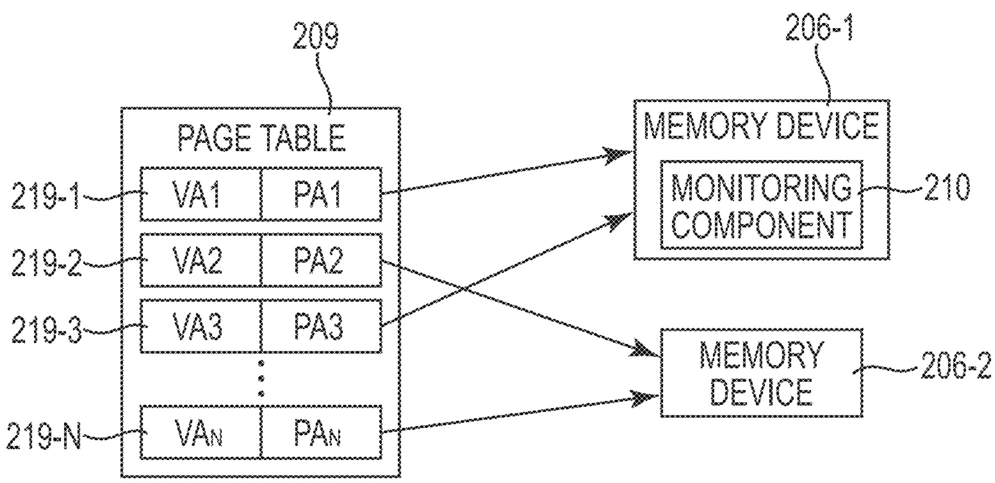
FIG. 2B illustrates an example of page table mappings to a number memory devices in accordance with various embodiments of the present disclosure.

FIG. 2B illustrates an example of page table mappings to a number of memory devices in accordance with various embodiments of the present disclosure. Similar to FIG. 2A, FIG. 2B includes a page table 209 that includes page table entries 219 that are allocated to memory devices 206-1 and 206-2.

In the embodiment shown in FIG. 2B, the first page table entry 219-1 and the third page table entry 219-3 are allocated to the first memory device 206-1. The first page table entry 219 includes a first virtual address (VA1) and corresponding physical address (PA1) and the third page table entry 219-3 includes a third virtual address (VA3) and corresponding physical address (PA3). By being allocated, by the page scheduling policy, to the first memory device 206-1, the pages of data in the first page table entry 219-1 and third page table entry 219-3 can be monitored by the monitoring component 210. The page scheduling policy can use the access statistics of the first page table entry 219-1 and the third page table entry 219-3 to allocate pages logically grouped with the first page table entry 219-1 and/or the third page table entry 219-3 to either the first memory device 206-1 or the second memory device 206-2.

In some embodiments, FIG. 2B illustrates an embodiment in which the monitoring component 210 has already monitored the access statistics of the page table entries 219 and allocated the pages of memory in the page table entries 219 to either the first memory device 206-1 or the second memory device 260-2. In these embodiments, the pages of memory in the first page table entry 219-1 and the pages of memory of the third page table entry 219-3 may have been allocated to the first memory device 206-1 because the pages of data in the first page table entry 219-1 and the third page table entry 219-3 have been determined to be less frequently accessed pages data. Therefore, the pages of data in the first page table entry 219-1 and the third page table entry 219-3 may have been allocated to the first memory device 206-1 that has a higher latency than the second memory device 206-2. Further, in these embodiments, access statistics of the pages of data in the second page table entry 219-2 and the Nth page table entry 219-N may have been monitored by the monitoring component 210 and may have been determined to be more frequently accessed pages of data. Therefore, the pages of memory in the second page table entry 219-2 and the Nth page table entry 219-N may have been allocated to the second memory device 206-2 that has a lower latency than the first memory device 206-1.

In some embodiments, the access statistics can include the least recently used pages of memory, an order in which the pages of memory were accessed, whether a cache line was accessed, and separate statistics for read applications and write applications performed on the pages of memory. When monitoring whether a cache line was accessed, a sub-page bit map that tracks which individual cache lines were accessed within a page of memory can be used. In some embodiments, a bit can set for every time a cache line is accessed to signify that the location was accessed.

Due to monitoring the access statistics of pages of memory, a latency of the first memory device 206-1 may be greater than or equal to a latency of the second memory device 206-2. Further, due to monitoring the access statistics of pages of memory, a bandwidth of the first memory device 206-1 can be less than or equal to a bandwidth of the second memory device. The first memory device 206-1 can have a higher latency and a lower bandwidth because the monitoring component 210 monitors the access statistics of the pages of memory allocated to the first memory device 206-1. Monitoring the access statistics of the pages of memory allocated to the first memory device 206-1 consumes time and resources, therefore, the latency of the first memory device 206-1 can be greater than or equal to the latency of the second memory device 206-1 and the bandwidth of the first memory device 206-1 can be less than or equal to the bandwidth of the second memory device, which does not include a monitoring component 210.

In some embodiments, the first memory device 206-1 can also be configured to receive at least one page of memory corresponding to an application executed on a third memory device (e.g., memory device 106-3 in FIG. 1). Similar to the second memory device 206-2, the third memory device may not include a memory device controller or monitoring component. Therefore, the latency of the first memory device 206-1 can be greater than or equal to a latency of the third memory device. Further, the bandwidth of the first memory device 206-1 can be less than or equal to a bandwidth of the third memory device.

Figure 3:
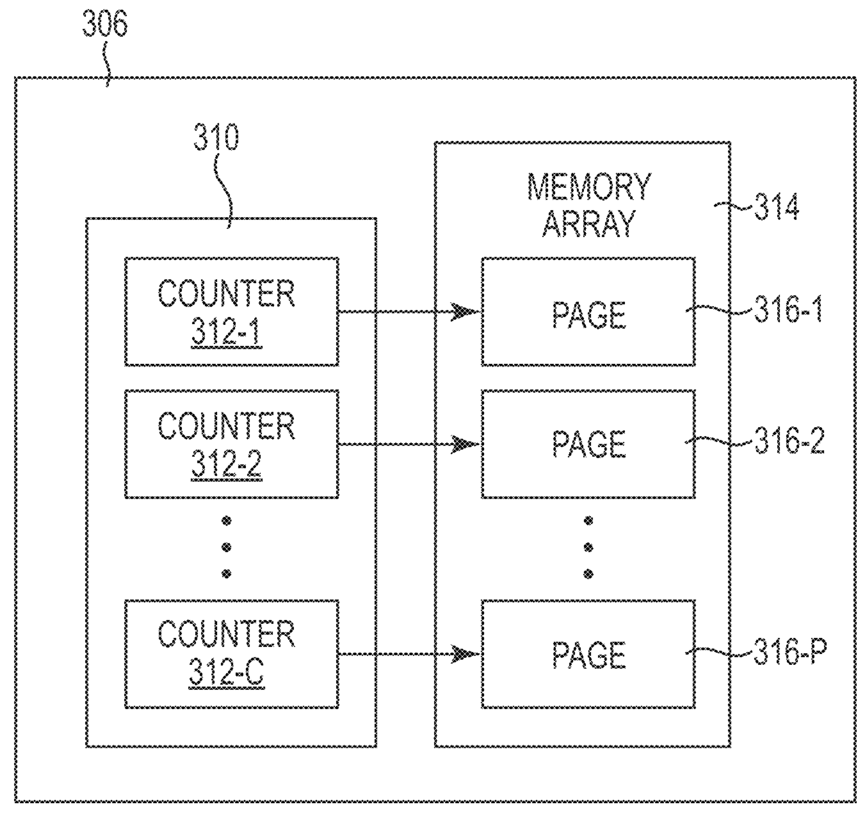
FIG. 3 illustrates an example of a memory device that includes a monitoring component in accordance with various embodiments of the present disclosure.

FIG. 3 illustrates an example memory device 306 that includes a monitoring component 310 in accordance with some embodiments of the present disclosure. The monitoring component 310 can include counters 312-1, 312-2, . . . , 312-N (individually or collectively referred to as counters 312). The memory device 306 can also include a memory array 314 that includes pages of memory 316-1, 316-2, . . . , 316-N (individually or collectively referred to as pages of memory 316).

The counters 312 can include hardware that can store one or more values (e.g., logical values, numerical values, etc.). For example, the counters 312 can be a cache (e.g., an SRAM cache), register/registers, latches, or the like. The values written to, or stored by, the counters 312 can correspond to access statistics of the pages of memory that are collected by the monitoring component 310. In some embodiments, the counters 312 can be stored in the memory array 314.

As shown in FIG. 3, the pages of memory 316 are coupled to respective counters 312 within the monitoring component 310. In some embodiments, the monitoring component 310 can monitor the pages of memory 316 on a page-by-page basis. That is, the monitoring component 310 can monitor each (or at least some) of the pages of memory 316 individually to determine access statistics associated with the pages of memory 316 during execution of the application on the pages of memory. As stated earlier, the access statistics can include, but are not limited to, the least recently used pages of memory, an order in which the pages of memory are accessed, whether cache lines are accessed, and a number of reads and writes executed on the pages of memory.

The counters 312 can be incremented in response to a determination that one or more of the above enumerated access statistics, among others, has been detected by the monitoring component 310. The monitoring component 310 can analyze information stored by the counters 312 to determine the access statistics of the different pages of memory 316 on a page-by-page basis. In some embodiments, the count of the counters 312 can be reset when the at least one page of memory for the application is removed from the first memory device. Further, the count of the counters 312 can be reset after the host reads the access statistics of the at least one page of memory for the application. This can result in a reduced decrease in performance of the computing system while the monitoring component 310 is monitoring access statistics of pages of memory relative to previous approaches in which the monitoring component 310 monitors the access statistics of every page of an application.

In some embodiments, the memory device 306 can be configured to receive at least one page of memory 316 corresponding to an application page that was previously allocated on a different memory device (e.g., memory device 106-2 in FIG. 1). As shown in FIG. 1 the monitoring component 310 can be embedded in the memory device controller (e.g., memory device controller 108 in FIG. 1). The memory device 306 can receive at least one page of memory 316 corresponding to an application whose other pages may reside on second memory device and/or third memory device (e.g., memory device 106-3 in FIG. 1). Further, the monitoring component 310 can be configured to monitor access statistics of the at least one page of memory 316.

In some embodiments, the access statistics can include the least recently used pages of memory, an order in which the pages of memory were accessed, whether a cache line was accessed, and separate statistics for read applications and write applications performed on the pages of memory 316. When monitoring whether a cache line was accessed, a sub-page bit map that tracks which individual cache lines were accessed within a page of memory 316 can be used. In some embodiments, a bit can set for every time a cache line is accessed to signify that the location was accessed.

Due to monitoring the access statistics of pages of memory 316, a latency of the memory device 306 may be greater than or equal to a latency of the second memory device. Further, due to monitoring the access statistics of pages of memory 316, a bandwidth of the memory device 306 can be less than or equal to a bandwidth of the second memory device. The memory device 306 can have a higher latency and a lower bandwidth because the monitoring component 310 monitors the access statistics of the pages of memory 316 allocated to the memory device 306. Monitoring the access statistics of the pages of memory 316 allocated to the memory device 306 consumes time and resources, therefore, the latency of the memory device 306 can be greater than or equal to the latency of the second memory device and the bandwidth of the memory device 306 can be less than or equal to the bandwidth of the second memory device, which does not include a monitoring component 310.

In some embodiments, the memory device 306 can also be configured to receive at least one page of memory 316 that may have previously been allocated on a third memory device (e.g., memory device 106-3 in FIG. 1). Similar to the second memory device, the third memory device may not include a memory device controller or monitoring component. Therefore, the latency of the memory device 306 can be greater than or equal to a latency of the third memory device. Further, the bandwidth of the memory device 306 can be less than or equal to a bandwidth of the third memory device.

In some embodiments, the memory device controller can be configured to store the access statistics of the at least one page of memory corresponding to the application in the memory device 306. The memory device controller is configured to save the access statistics of the at least one page of memory to a table in the memory device 306. In some embodiments, the table of statistics can be accessible through the memory device controller. The table of statistics can be stored entirely on a controller chip, stored in a reserve portion of the underlying memory, and/or cached by the memory device controller if it is not in the memory device 306.

Figure 4:
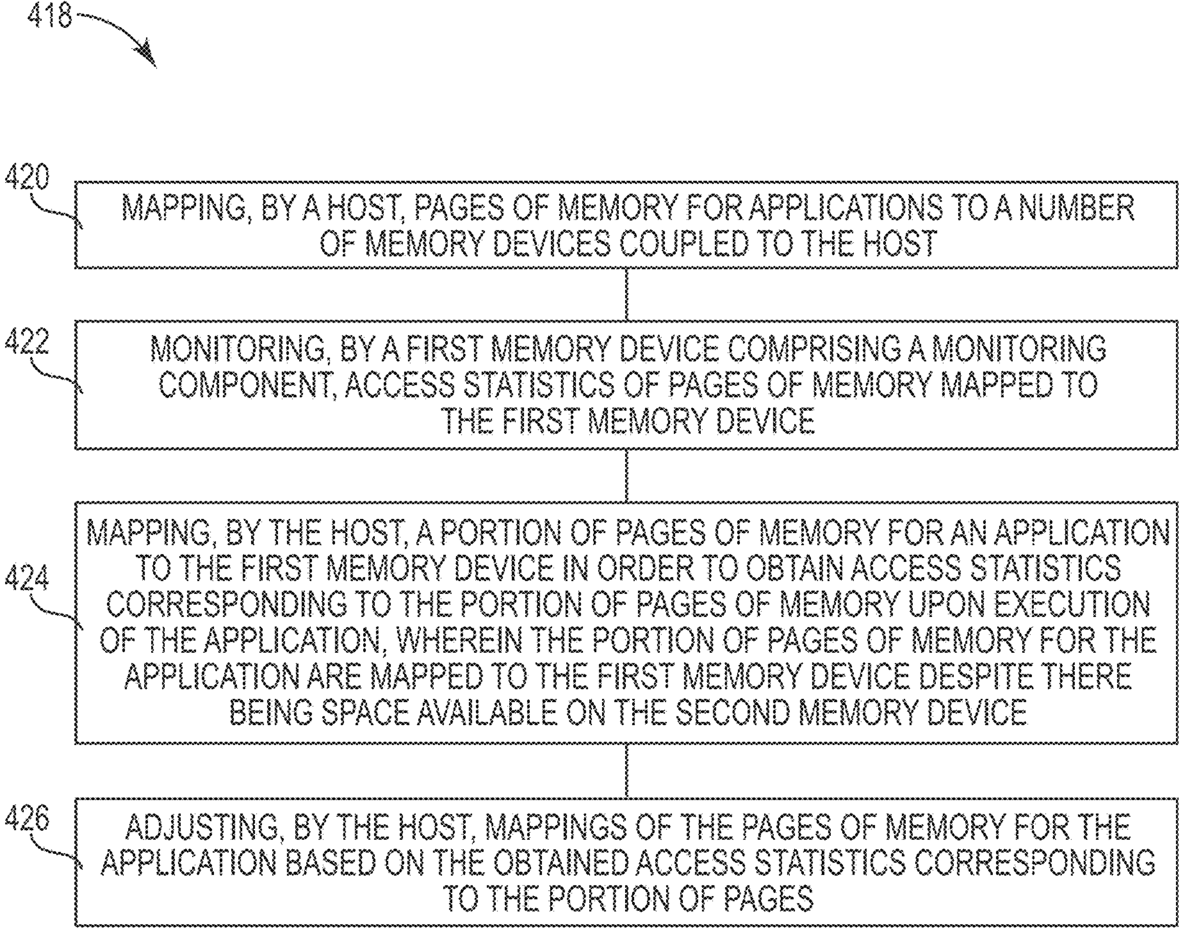
FIG. 4 is a flow diagram corresponding to a method for memory access statistics monitoring in accordance with various embodiments of the present disclosure.

FIG. 4 is a flow diagram corresponding to a method 418 for a monitoring component for monitoring access statistics in accordance with some embodiments of the present disclosure. The method 418 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 420, the method 418 can include mapping, by a host, pages of memory for applications to a number of memory devices coupled to the host. In some embodiments, an address for the at least one page of memory for the application and the other pages of memory for the application can be permanently mapped to the first memory device. If the addresses for the pages of memory are permanently mapped to the first memory device, the mapped addresses can continue to be allocated to the first memory device after the access statistics for the mapped pages of memory have been monitored. In other embodiments, the address for the at least one page of memory for the application and the other pages of memory for the application can be temporarily mapped to the first memory device. If the addresses for the pages of memory are temporarily mapped to the first memory device, the mapped address for the pages of memory can be mapped to the second memory device and/or the third memory device after the access statistics of the pages of memory have been monitored.

At block 422, the method 418 can include monitoring, by a first memory device comprising a monitoring component, access statistics of pages of memory mapped to the first memory device. In some embodiments, the operating system can decide which pages of memory are monitored by the monitoring component and the interval of time over which the memory pages are monitored. For example, the operating system can decide how long each period of access statistics monitoring lasts and the how long each period of time between each period of access statistics monitoring lasts.

At block 424, the method 418 can include mapping, by the host, a portion of pages of memory for an application to the first memory device in order to obtain access statistics corresponding to the portion of pages of memory upon execution of the application, wherein the portion of pages of memory for the application are mapped to the first memory device despite there being space available on the second memory device. In some embodiments the portion of pages of memory for the application are mapped to the first memory device despite there being space available on the third memory device. The host can include a table of statistics to store access statistics of pages of memory. In some embodiments, the table of statistics can be accessible through the memory device controller. Further, the table of statistics can be stored entirely on a controller chip or stored in reserve portion of the underlying memory and/or cached by the memory device controller if it is not in that memory.

At block 426, the method 418 can include adjusting, by the host, mappings of the pages of memory for the application based on the obtained access statistics corresponding to the portion of pages. In some embodiments, at least one page of memory for the application and the other pages of memory of the application can be mapped to the first memory device when the at least one page of memory for the application is accessed less than a threshold amount of times within a certain period of time. In some embodiments, the at least one page of memory for the application and the other pages of memory of the application can be mapped to the second memory device when the at least one page of memory for the application and the other pages of memory for the application are accessed more than a threshold amount of times within a certain time period.

Figure 5:
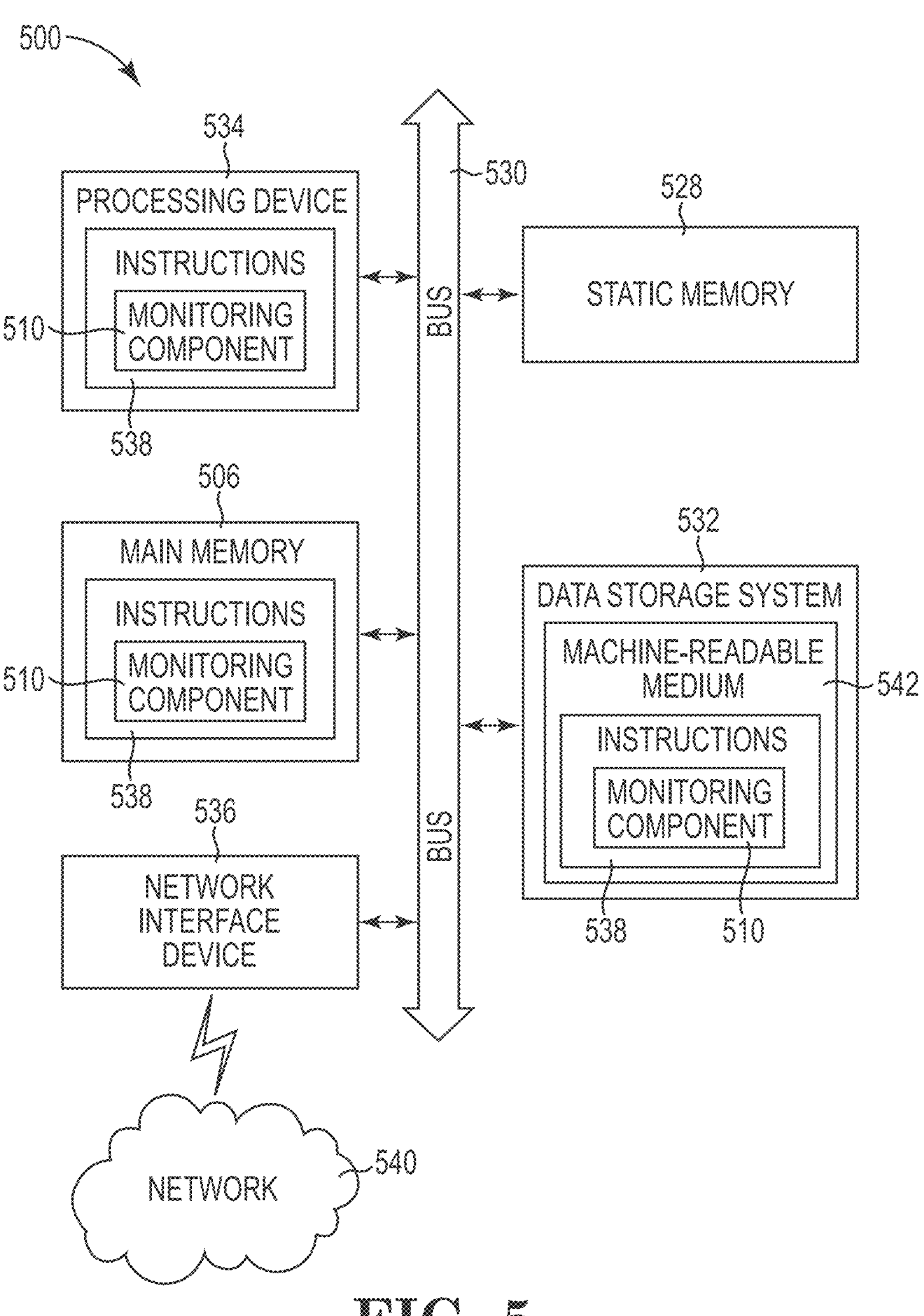
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 includes, is coupled to, or utilizes a memory sub-system or can be used to perform the operations of a controller (e.g., to execute an operating system to perform operations corresponding to the monitoring component 110 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 534, a main memory (e.g., memory device) 506 (e.g., read-only memory (ROM), flash memory, dynamic random access memory (DRAM) such as synchronous DRAM (SDRAM) or Rambus DRAM (RDRAM), etc.), a static memory 528 (e.g., flash memory, static random access memory (SRAM), etc.), and a data storage system 532, which communicate with each other via a bus 530.

The processing device 534 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 534 can also be one or more special-purpose processing devices such as an application specific integrated circuit (ASIC), a field programmable gate array (FPGA), a digital signal processor (DSP), network processor, or the like. The processing device 534 is configured to execute instructions 538 for performing the operations and steps discussed herein. The computer system 500 can further include a network interface device 536 to communicate over the network 540.

The data storage system 532 can include a machine-readable storage medium 542 (also known as a computer-readable medium) on which is stored one or more sets of instructions 538 or software embodying any one or more of the methodologies or functions described herein. The instructions 538 can also reside, completely or at least partially, within the main memory 506 and/or within the processing device 534 during execution thereof by the computer system 500, the main memory 506 and the processing device 534 also constituting machine-readable storage media.

In one embodiment, the instructions 534 include instructions to implement functionality corresponding to a monitoring component 510 (e.g., the monitoring component 110 of FIG. 1) for monitoring access statistics of pages of data. While the machine-readable storage medium 542 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common access, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:

a host configured to map virtual pages of memory for applications to a number of memory devices coupled thereto;

a first memory device; and a second memory device;

wherein the host is configured to map a portion of virtual pages of a total number of virtual pages of memory for an application to the first memory device such that there is an equal number of remaining virtual pages of memory mapped to the second memory device between each page of the portion of virtual pages of the total number of virtual pages of memory mapped to the first memory device;

wherein the portion of virtual pages includes a plurality of virtual pages;

wherein obtained access statistics for the remaining portion of virtual pages of memory for the application mapped to the second memory device are extrapolated based on the access statistics of the portion of virtual pages of memory for the application mapped to the first memory device.

2. The apparatus of claim 1, wherein the first memory device includes a monitoring component configured to monitor the access statistics of the virtual pages of memory mapped to the first memory device.

3. The apparatus of claim 2, wherein the second memory device does not include a monitoring component capable of monitoring access statistics of pages of memory mapped thereto.

4. The apparatus of claim 2, wherein the monitoring component comprises a page table configured to maintain a map of virtual addresses to physical addresses of pages of memory.

5. The apparatus of claim 4, wherein the page table only includes page table entries from the second memory device when none of the page table entries are being monitored by the monitoring component on the first memory device.

6. The apparatus of claim 1, wherein a monitoring component is on the second memory device and not on the first memory device.

7. An apparatus, comprising:

a first memory device comprising a monitoring component configured to monitor access statistics of virtual pages of memory mapped to the first memory device, wherein:

the first memory device is configured to receive at least one virtual page of a total number of virtual pages of memory corresponding to an application executed on a host such that there is an equal number of remaining virtual pages of memory mapped to a second memory device between the at least one virtual page mapped to the first memory device, wherein the at least one virtual page includes a plurality of virtual pages; and the host extrapolates access statistics for the remaining virtual pages of the total number of virtual pages of memory, including virtual pages of memory mapped to the second memory device, corresponding to the application executed on the host based on the access statistics of the at least one virtual page of the total number of virtual pages of memory for the application being mapped to the first memory device.

8. The apparatus of claim 7, wherein the first memory device further comprises a page table configured to maintain a map of virtual addresses to physical addresses of pages of memory.

9. The apparatus of claim 7, wherein the access statistics of the at least one virtual page of memory corresponding to the application are read by the host coupled to the first memory device and the second memory device.

10. The apparatus of claim 7, wherein the monitoring component includes counters configured to store logical values.

11. The apparatus of claim 10, wherein the counters are a cache memory.

12. A method, comprising:

mapping virtual pages of memory for applications to a number of memory devices coupled to a host such that, between each page of a portion of virtual pages of a total number of virtual pages of memory mapped to a first memory device, there is an equal number of remaining virtual pages of memory mapped to a second memory device;

monitoring, by the first memory device comprising a monitoring component, access statistics of virtual pages of memory mapped to the first memory device; and extrapolating, based on the access statistics of the portion of virtual pages of memory for an application mapped to the first memory device, access statistics for the remaining virtual pages of memory that are mapped to the second memory device, wherein the portion of virtual pages includes a plurality of virtual pages.

13. The method of claim 12, further comprising using the access statistics to determine a frequency of accesses of data.

14. The method of claim 13, wherein the monitoring component is in the first memory device and, in response to the monitoring component being in the first memory device, allocating data that is more frequently accessed than other data to the second memory device.

15. The method of claim 13, wherein the monitoring component is in the first memory device and, in response to the monitoring component being in the first memory device, allocating data that is less frequently accessed than other data to the first memory device.

16. The method of claim 12, further comprising incrementing counters in the monitoring component in response to the monitoring component detecting one or more access statistics.

17. The method of claim 16, further comprising analyzing, by the monitoring component, access statistics stored in the counters.

18. An apparatus, comprising:

a host configured to map virtual pages of memory for applications to a number of memory devices coupled thereto;

a first memory device; and a second memory device;

wherein the host is configured to map a portion of virtual pages of a total number of virtual pages of memory for an application to the first memory device such that there is an equal number of remaining virtual pages of memory mapped to the second memory device between each page of the portion of virtual pages of the total number of virtual pages of memory mapped to the first memory device;

wherein the portion of virtual pages includes a plurality of virtual pages;

wherein obtained access statistics for the remaining portion of virtual pages of memory for the application mapped to the second memory device are extrapolated based on the access statistics of the portion of virtual pages of memory for the application mapped to the first memory device;

wherein the host is configured to, despite there being space available on the second memory device, or a third memory device when the remaining portion of virtual pages of memory for the application is mapped to the third memory device, map the portion of virtual pages of the total number of virtual pages of memory for the application to the first memory device in order to obtain the access statistics corresponding to the remaining portion of the virtual pages of memory of the application upon execution of the application.

* * * * *